Patented Dec. 12, 1939

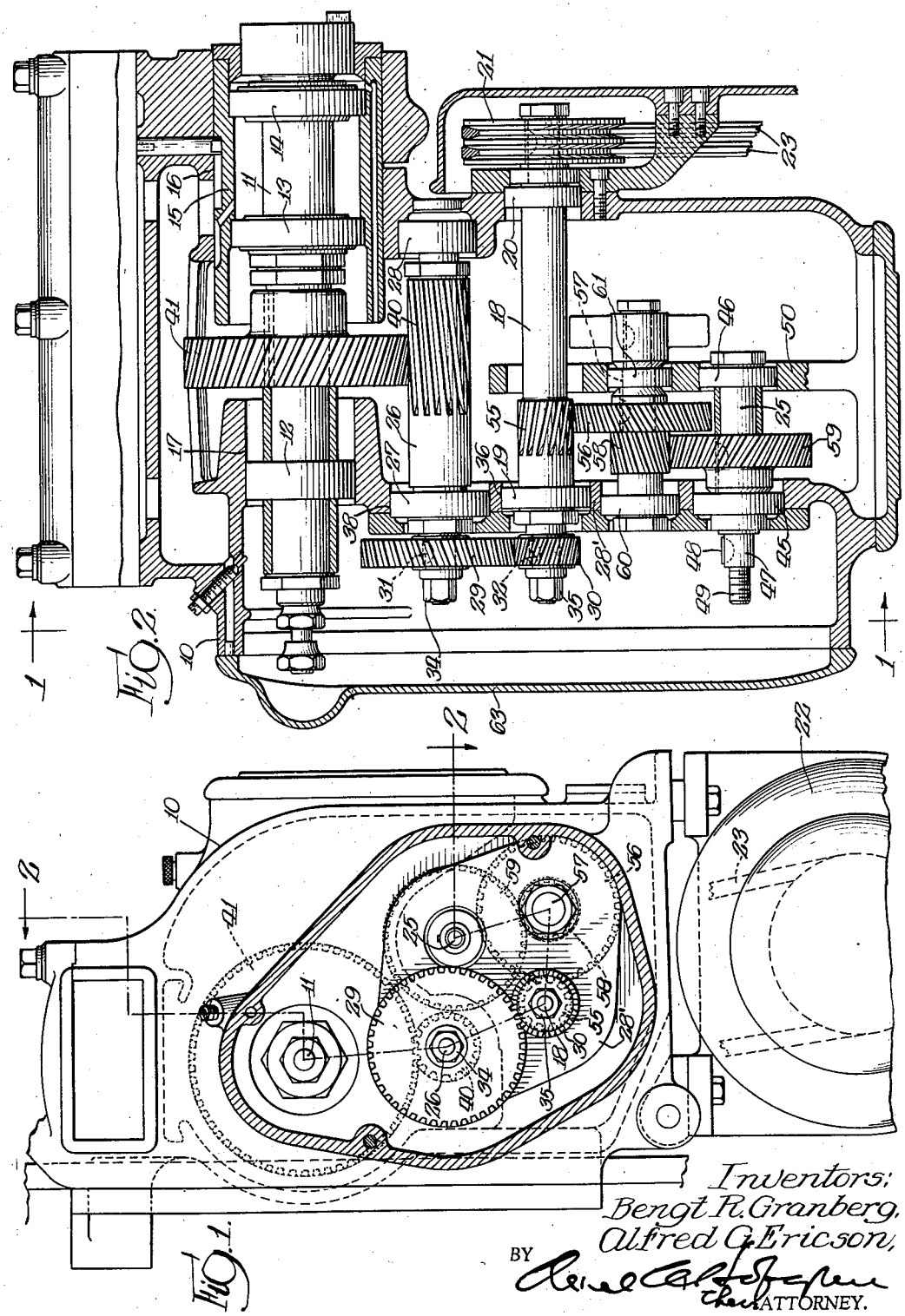

2,183,514

UNITED STATES PATENT OFFICE 2,183,514

GEARING

Bengt R. Granberg and Alfred G. Ericson, Rockford, Ill., assignors to Sundstrand Machine Tool Co., Rockford, Ill., a corporation of Illinois Application November 18, 1938, Serial No. 241,086

6 Claims. (Cl. 74—325)

The invention relates to speed change gearing of the type used in machine tools for driving spindles. It is the general object of the invention to provide new and improved gearing of this type.

Another object is to provide a new and improved gearing for driving a machine tool spindle at a number of preselected speeds extending over an extremely wide range.

Another object is to provide new and improved gearing of the pick-off type wherein a number of pairs of gears are provided to furnish definite spindle speeds and are reversible to provide additional speeds, together with means for enabling the use of the pick-off gears to obtain a still larger number of speeds extending over a wider range.

Further objects will become readily apparent from the following detailed description taken in connection with the accompanying drawing, wherein:

Fig. 1 is a fragmentary rear elevation (partly in section along the line 1—1 of Fig. 2) of the spindle head of a milling machine embodying a preferred form of the invention.

Fig. 2 is a fragmentary section along the line 2—2 of Fig. 1, expanded for the purpose of rendering the disclosure clearer.

Although we have illustrated in the drawing and shall herein describe a preferred form of the invention as embodied in the spindle gearing for a milling machine, it is to be understood that various modifications and alternative constructions may be adopted without departing from the spirit and scope of the invention as defined in the appended claims.

As illustrated in the drawing, the preferred form of the invention is embodied in the spindle supporting element or head 10 of a milling machine. A cutter supporting spindle 11 is rotatably mounted in the element 10 by means of anti-friction bearings 12, 13 and 14. The forward bearings 13 and 14 are carried in a sleeve or quill 15 which is slidably mounted in a cylindrical bore 16 in the supporting element to facilitate adjustment of the spindle longitudinally of its axis. During such adjustment, the rear bearing 12 slides longitudinally in a cylindrical bore 17. As illustrated in the drawing, a power driven shaft 18 is rotatably mounted in the element 10 by means of anti-friction bearings 19 and 20. At its forward end, the shaft 18 carries a multiple grooved pulley 21 which is driven from an electric motor 22 by means of a plurality of V-belts 23.

In order to obtain an extremely wide range of spindle speeds with a relatively small number of sets or pairs of pick-off gears, an arrangement of shafts and gearing is provided enabling the use of the pick-off gear sets on either of two power driven shafts which rotate at different speeds. The power driven shaft 18, for example, is utilized for supporting pick-off gears when it is desired to operate the spindle 11 at speeds in the higher portion of its range. A second power driven shaft 25 is arranged to support one of the pick-off gears of each set when it is desired to operate the spindle 11 at speeds in the lower portion of its range.

The drive from either of the power driven shafts to the spindle includes an intermediate shaft 26 which is rotatably mounted in anti-friction bearings 27 and 28. As illustrated in Fig. 2, the left hand end of shaft 26 and the left hand end of the power driven shaft 18 project through an interior wall 28' of the supporting element 10 and are fashioned on their outer or left hand ends for the reception of pick-off gears, such as 29 and 30. The projecting ends of the shafts are preferably provided with keys 31 and 32 which engage in suitable keyways in the pick-off gears, and have threaded ends for the reception of nuts 34 and 35 which when tightened function to hold the pick-off gears on the shaft. The bearings 19 and 27 are mounted in cylindrical openings 36 and 38 in the wall 28'. The drive from the intermediate shaft 26 to the spindle 11 comprises an elongated spiral pinion 40 formed on the shaft 26 and a corresponding spiral gear 41 secured to the spindle 11, the pinion 40 being elongated so as to permit of the longitudinal adjustment of the spindle 11. As illustrated in Fig. 2, the drive from the power driven shaft 18 to the spindle is through the pick-off gears 30 and 29, intermediate shaft 26, pinion 40, and gear 41.

It is the practice in manufacturing machine tools equipped with pick-off gears to provide a specified number of sets or pairs of pick-off gears so that the purchaser will have on hand the necessary gears for changing the speed of the spindle within a definite range. The range is determined by that set or pair of gears which is made up of the largest gear and smallest gear. Such a set is illustrated in the drawing wherein the smallest gear 30 is mounted on the power driven shaft 18, and the gear 29 is mounted on the intermediate shaft 26. This arrangement, therefore, provides for the lowest spindle speed possible. By reversing the pick-off gears so that the smallest gear 30 is mounted on the intermediate shaft 26 and the largest gear 29 is mounted on the power driven shaft 18, the spindle 11 will be driven at the highest available speed. It is to be understood that the other sets of pick-off gears must all be designed to fit the ends of the shafts 18 and 26 and the predetermined spacing between the axes of the shafts. These other sets are generally provided in sizes ranging between those illustrated and two gears of substantially equal diameter.

In order to increase the range and the number of speeds at which the spindle 11 may be driven without requiring additional sets of pick-off gears, the invention includes the second drive shaft hereinbefore mentioned. This power driven shaft is rotatably mounted in anti-friction bearings 45 and 46 and has a projecting end 47 carrying a key 48 and a threaded portion 49. The actual relationship of the shaft 25 to the intermediate shaft 26 is shown in Fig. 1. Here again the bearing 45 is mounted in the wall 28' whereas the bearing 46 is mounted in an upstanding integral portion 50 of the supporting element 10. As shown in Fig. 1, the shaft 25 is positioned somewhat to one side of the intermediate shaft 26, the axis of the shaft 25 being located at a distance from the axis of the shaft 26 exactly equal to the distance between the axis of the shaft 18 and the shaft 26. This is to permit the driving gear of each set of pick-off gears to be mounted either on the power driven shaft 18 or on the power driven shaft 25, the other pick-off gear of each set being mounted at all times on the intermediate shaft 26.

The range of spindle speeds obtainable when the driving pick-off gear is mounted on shaft 25 is determined by gearing intermediate the shaft 18 and the shaft 25. As illustrated herein, this gearing comprises a pinion 55 formed on the shaft 18 and meshing with a gear 56 keyed on a short shaft 57, and another pinion 58 on the shaft 57 which meshes with a gear 59 keyed to the shaft 25. The shaft 57 is rotatably mounted in anti-friction bearings 60 and 61, bearing 60 being supported in the wall 28' and the bearing 61 being supported in the portion 50 of the supporting element 10. With the double reduction gearing shown intermedate shaft 18 and shaft 25, the spindle speeds available when shaft 25 is used for mounting the driving pick-off gear are substantially lower than those available when the shaft 18 is used for mounting the driving pick-off gear.

In order to change the gearing set-up of the machine as illustrated in the drawing, it is merely necessary to remove the nut 35 and the driving pick-off gear 30 from the shaft 18 and to replace these parts on the shaft 25. The drive from the power driven shaft 18 to the spindle 11 will then be through the gearing 55, 56, 58, 59, pick-off gears 30 and 29, shaft 26, pinion 40 and gear 41.

It is believed readily apparent that the invention as disclosed herein provides a simple gearing arrangement for obtaining a wide range of spindle speeds with a minimum number of sets of pick-off gears. For any specified number of sets of pick-off gears, it is possible to obtain double the number of spindle speeds obtainable heretofore. Preferably, a detachable cover 63 is provided to enclose the ends of the shafts and pick-off gears.

We claim as our invention:

1. In a milling machine, in combination, a spindle supporting element, a spindle rotatably mounted on said element, a first power driven shaft rotatably mounted on said element on an axis parallel to and spaced from the spindle axis, an intermediate shaft rotatably mounted on said element, means forming a gear connection between said intermediate shaft and said spindle, said first power driven shaft and intermediate shaft having projecting ends arranged to receive pairs of pick-off gears to form a direct drive between said first power driven shaft and the intermediate shaft, and means for driving the intermediate shaft by the same pick-off gears at another speed comprising a second power driven shaft rotatably mounted on said element on an axis parallel to said intermediate shaft spaced therefrom a distance equal to the distance between said intermediate shaft and said first power driven shaft and having one end projecting to receive a pick-off gear positioned to mesh with a corresponding pick-off gear on said intermediate shaft and means for driving said second power driven shaft from said first power driven shaft comprising reduction gearing.

2. In a milling machine, in combination, a spindle supporting element, a spindle rotatably mounted on said element, a first power driven shaft rotatably mounted on said element on an axis parallel to and spaced from the spindle axis, an intermediate shaft rotatably mounted on said element, means forming a driving connection between said intermediate shaft and said spindle, said first power driven shaft and intermediate shaft having portions arranged to receive pairs of pick-off gears to complete a drive connecting between said first power driven shaft and the intermediate shaft, and means for alternatively driving the intermediate shaft by the same pick-off gears at another speed comprising a second power driven shaft rotatably mounted on said element on an axis parallel to said intermediate shaft spaced therefrom a distance equal to the distance between said intermedate shaft and said first power driven shaft and having a portion arranged to receive a pick-off gear positioned to mesh with a corresponding pick-off gear on said intermediate shaft and means for driving said second power driven shaft at a speed different from that of said first power driven shaft.

3. In combination with a rotatably mounted spindle, means for driving said spindle at a plurality of speeds comprising a power driven shaft and a second shaft having adjacent ends fitted to receive pairs of pick-off gears, intermeshing gearing between said second shaft and spindle, a third shaft having one end fitted to receive the pick-off gears otherwise placed on said power driven shaft to position said gears in meshing relation with corresponding gears fitted on said second shaft, and means for driving said third shaft from said power driven shaft including a fourth shaft, intermeshing reduction gears on said power driven shaft and fourth shaft, and intermeshing reduction gears on said fourth shaft and third shaft.

4. In combination with a rotatably mounted spindle, means for driving said spindle at a plurality of speeds comprising a power driven shaft and a second shaft having adjacent ends fitted to receive pairs of pick-off gears, intermeshing gearing between said second shaft and spindle, a third shaft having one end fitted to receive the pick-off gears otherwise placed on said power driven shaft to position said gears in meshing relation with corresponding gears fitted on said second shaft, and means for driving said third shaft from said power driven shaft at a speed different from that of said power driven shaft.

5. In combination with a rotatably mounted spindle, means for driving said spindle at a plurality of speeds comprising a power driven shaft and a second shaft having portions fitted to receive pairs of pick-off gears, means forming a driving connection between said second shaft and spindle, a third shaft having a portion fitted to receive the pick-off gears otherwise placed on said power driven shaft to position said gears in meshing relation with corresponding gears fitted on said second shaft, and means for driving said third shaft from said power driven shaft including reduction gearing.

6. The combination of a power driven shaft and a second shaft having adjacent ends fitted to receive pairs of pick-off gears, a third shaft having one end fitted to receive the pick-off gears otherwise placed on said power driven shaft to position said gears in meshing relation with corresponding gears fitted on said second shaft, and means for driving said third shaft from said power driven shaft at a speed different from that of said power driven shaft.

BENGT R. GRANBERG.
ALFRED G. ERICSON.